(12) United States Patent
Kordon

(10) Patent No.: US 7,093,614 B2
(45) Date of Patent: Aug. 22, 2006

(54) SOLENOID VALVE FOR A COOLANT CIRCUIT

(75) Inventor: Rolf Kordon, Giengen (DE)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 0 days.

(21) Appl. No.: 10/460,441

(22) Filed: Jun. 12, 2003

(65) Prior Publication Data

US 2004/0050431 A1    Mar. 18, 2004

(30) Foreign Application Priority Data

Dec. 15, 2000   (DE) ............................ 100 62 665.3

(51) Int. Cl.
*F16K 11/044*  (2006.01)

(52) U.S. Cl. ................. 137/625.5; 251/129.15

(58) Field of Classification Search .......... 137/625.43, 137/625.5; 251/129.15; 62/198
See application file for complete search history.

(56) References Cited

U.S. PATENT DOCUMENTS

| | | | |
|---|---|---|---|
| 3,203,447 A | | 8/1965 | Bremmer et al. |
| 3,379,214 A | * | 4/1968 | Weinberg ................. 137/625.5 |
| 4,459,819 A | * | 7/1984 | Hargraves .................... 62/212 |
| 4,712,582 A | * | 12/1987 | Marks .................... 137/625.29 |
| 5,765,391 A | | 6/1998 | Lee et al. |
| 6,026,860 A | * | 2/2000 | Teichmann ................. 137/870 |
| 6,382,256 B1 | * | 5/2002 | Kim et al. .................. 137/870 |
| 6,644,044 B1 | * | 11/2003 | Kranz et al. .................. 62/115 |

FOREIGN PATENT DOCUMENTS

| | | |
|---|---|---|
| DE | 3718490 A1 | 12/1987 |
| DE | 19546384 A1 | 6/1997 |
| DE | 19547744 A1 | 6/1997 |
| DE | 19922466 A1 | 12/2000 |
| EP | 0779459 A2 | 6/1997 |
| WO | WO 0049320 A1 | 8/2000 |

* cited by examiner

*Primary Examiner*—John Fox
(74) *Attorney, Agent, or Firm*—John T. Winburn; Russell W. Warnock; Craig J. Loest

(57) ABSTRACT

A solenoid valve for a coolant circuit including a valve body having at least one inlet and at least one outlet for the coolant. A valve member is displaceable in the interior of the valve body between two switching positions for the solenoid valve. At least one outlet is formed by a capillary tube.

9 Claims, 2 Drawing Sheets

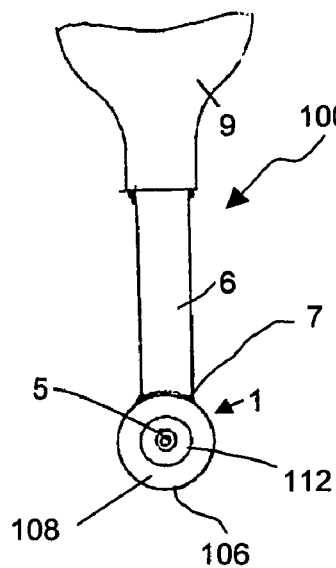
Fig. 1
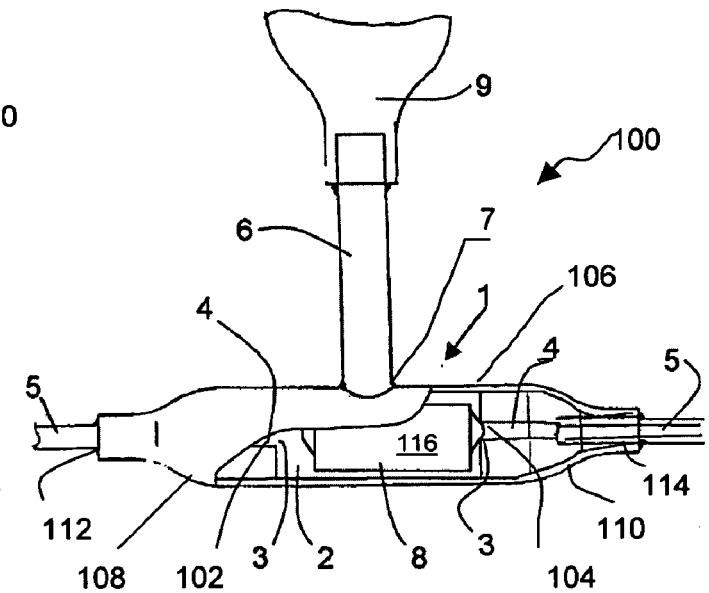
Fig. 2
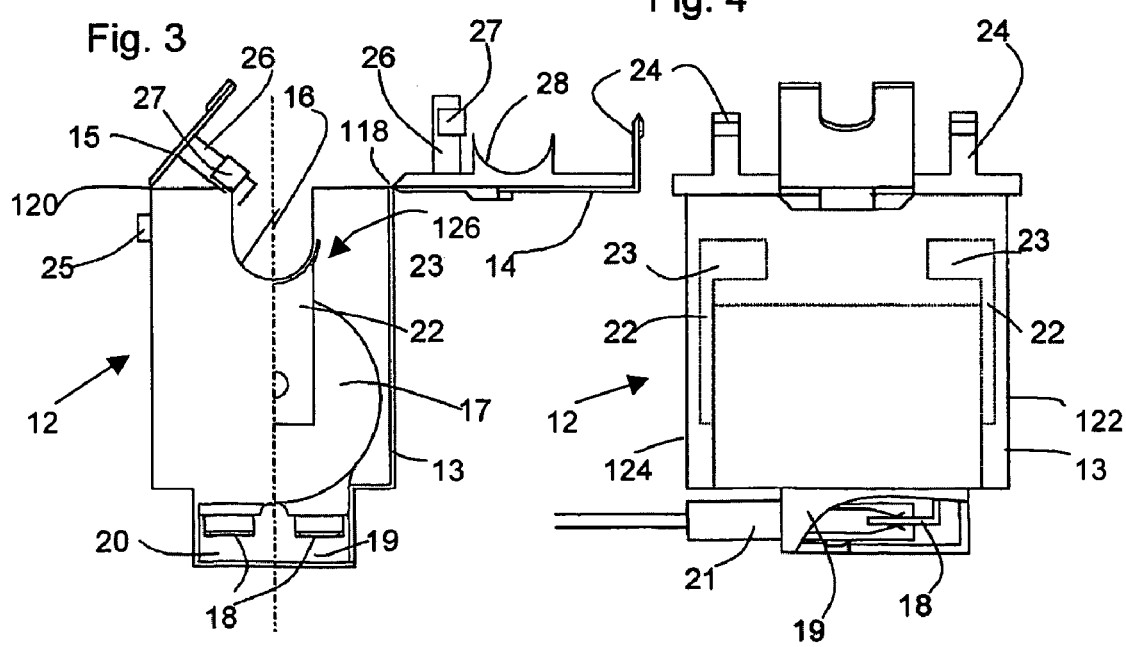
Fig. 3
Fig. 4

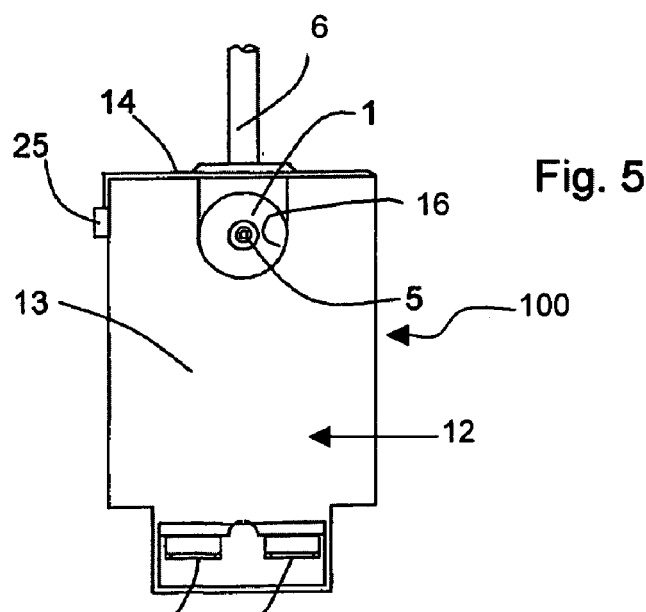
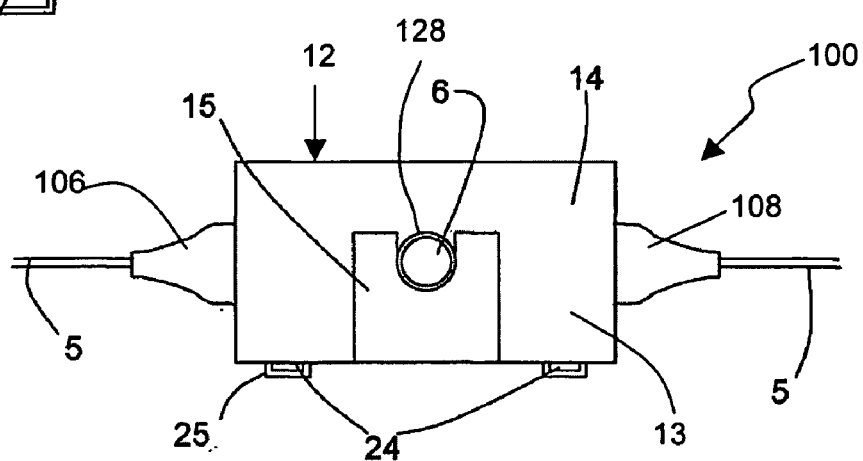

SOLENOID VALVE FOR A COOLANT CIRCUIT

BACKGROUND OF THE INVENTION

Field of the Invention

The present invention relates to a solenoid valve for a coolant circuit, with a valve body that has an inlet and at least one outlet for the coolant, and a valve member that can be displaced in the interior of the valve body between two positions that respectively correspond to the different switching positions of the solenoid valve.

Such a solenoid valve is used to control the coolant flow in the coolant circuit or, in cases where the solenoid valve is designed as a directional path valve with several outlets, to switch a coolant flow to one or the other of at least two evaporators of the coolant circuit.

A solenoid valve of the type described above is known from DE 37 18 94 A1.

BRIEF SUMMARY OF THE INVENTION

The object of the invention is to provide a solenoid valve of the type specified above that allows simpler, faster and therefore more economically-priced construction of a coolant circuit compared with solenoid valves known so far.

The present invention includes at least one outlet of the solenoid valve according to the invention is formed by a capillary tube, the solenoid valve thus can at the same time fulfill the task of a pressure-relieving element for the coolant which is supplied at high pressure. This reduces the number of parts which must be joined together during the manufacture of a coolant circuit and the number of connection points between them. This results in savings in production time and costs without the need to accept cutbacks in the quality of the coolant circuit. On the contrary, the reduced number of joints reduces the risk of leakages in the coolant circuit.

So that the capillary tube forming the outlet of the solenoid valve can also fulfil the task of a press-relieving element for the coolant under high pressure, it is desirable that the pressure drop between the beginning and end of the capillary tube is a multiple of the pressure drop between the inlet of the solenoid valve and the beginning of the capillary tube. In other words, the pressure drop at the valve seat of the solenoid valve is largely negligible compared with that in the capillary tube.

The solenoid valve preferably has two outlets which are each formed by a capillary tube. Such a solenoid valve allows the selective operation of two connected evaporators, e.g. a cooling area and a freezing area of a combined refrigerating device.

Each outlet is more appropriately arranged at a longitudinal end of a valve body and the inlet is arranged centrally on the valve body, and a coil is provided for generating a magnetic field in the longitudinal direction of the valve body. This allows the valve member to be simply controlled with the aid of a single magnetic field by means of linear forward and backward movement.

In order to supply the magnetic field in the valve body, the valve body is preferably arranged outside the interior of the coil and the coil has two pole pieces in contact with the valve body. With such an arrangement it is also possible to repair or change the coil after the coolant circuit has been fully installed without the need to break the coolant circuit for this purpose.

A further simplification of the structure of the coolant circuit and reduction in the number of parts is obtained if the inlet of the solenoid valve is formed by an outlet pipe section of a coolant drier joined to the valve body, which is usually provided in the coolant circuit of a refrigerating device.

BRIEF DESCRIPTION OF THE DRAWING

Further features and advantages of the invention are obtained from the following description of an embodiment with reference to the drawings, wherein:

FIGS. 1 and 2 show two views of a valve body of a solenoid valve according to the invention;

FIGS. 3 and 4 show two views of a housing of the solenoid valve according to the invention with the coil installed therein in the perspective respectively corresponding to those in FIG. 1 or 2;

FIG. 5 is a view of the solenoid valve after joining together in a perspective corresponding to that in FIG. 1 and FIG. 3; and FIG. 6 is a top view of the solenoid valve from FIG. 5.

DETAILED DESCRIPTION OF THE INVENTION

FIGS. 1 and 2 show the valve body 1 of a solenoid valve 100 according to the invention in two views from mutually perpendicular directions. The valve body 1 is shown in a partly cutaway view in FIG. 2 in order to explain its mode of operation better. A chamber 2 in the interior of the valve body 1 is bounded at two ends by valve seats 3 each having a central hole 102, 104 which forms the outlet 4 of the valve 100. A tube 106 of the valve body 1 is tapered towards its two ends 108, 110 and capillary tubes 5 are tightly soldered into the end openings 112, 114 of the valve body 1. The capillary tubes 5 are provided to be each connected to an evaporator of the coolant circuit (not illustrated), typically an evaporator assigned to the cooling area and an evaporator assigned to the freezing area of a combination refrigerating device (not illustrated). The length and diameter of the capillary tubes 5 on the one hand and the through cross-sections in the valve body 1 on the other hand are matched one to the other so that the pressure drop at a capillary tube 5 through which coolant flows is at least twice and preferably a multiple of the pressure drop in the valve body 1.

An inlet pipe 6 coming from a drier 9, having a diameter larger than that of the capillary tube 5, is soldered onto an inlet 7 of the valve body 1, which opens centrally into the chamber 2.

A valve member 8 in the form of a cylindrical body 116 made of ferromagnetic material is displaceable in the chamber 2 between two end positions at the valve seats 3 in which it respectively closes one of the two outlets 4.

FIGS. 3 and 4 show views of a housing 12 provided to accommodate the valve body 1 in respectively the same perspectives as those in FIGS. 1 and 2. The housing 12 can be manufactured, for example, by injection moulding from plastic, e.g. from polypropylene. The housing 12 includes a substantially rectangular main body 13 which is open at one side, located at the top in FIGS. 3 and 4. A large and a small cover section 14, 15 are joined to the upper edge of the main body 13 by means of film hinges 118, 120 on opposite sides.

Two opposite walls 122, 124 of the main body 13 each have a U-shaped cut-out 16 which runs in a semicircular fashion in its lower region. The size of the cut-out 16 is such that the valve body 1 can be inserted therein with a small amount of play.

To the right of a line X—X in FIG. 3 the main body 13 is shown in cutaway view. In its interior 126 can be seen a substantially cylindrical coil 17 with two contact tabs 18 for the power supply (not illustrated) to the coil, which engage in a chamber 19 moulded onto the main body 13 at the bottom. The chamber 19 has a window 20 through which a connector 21 can be inserted and can make contact with the contact tabs 18.

Two iron castings 22 shown by dashed lines in FIG. 4 are riveted onto the core of the coil 17. At their ends away from the coil core, the iron castings 22 form two pole pieces 23 in the form of semi-cylindrical grooves which, after attachment of the valve body 1, abut against the valve body 1.

The two cover sections 14, 15 are constructed such that after attachment of the valve body 1, they can be clipped shut and located, as shown in FIG. 5. The cover sections 14, 15 completely cover the upper side of the housing 12 except for a circular hole 128 bounded by both cover sections 14, 15, that accommodates the inlet pipe 6 as shown in FIG. 6. For locking the housing 12 in the closed state the large cover section 14 is provided with two locking lances 24 which in the closed state engage in eyes 25 on the opposite wall of the main body 13. The small cover section 15 is provided with projections (not illustrated) which in the closed state of the cover are covered by the large cover section 14. Thus, both cover sections are held closed by locating the large cover section 14 in the eyes 25.

Moulded onto the large cover section 14 complementary to the cut-outs 16 of the main body 13 are semi-circularly cut-out cross-pieces 28 which together with the cut-outs 16 encompass the valve body 1 when the cover is closed. By this means and by the inlet pipe 6 being held in the circular hole 128 formed by the two cover sections 14, 15, the valve body 1 is completely fixed in the housing 12.

At least one of the cover sections 14, 15 has a projection 26 directed into the interior of the housing 12 when the cover is closed, which holds a permanent magnet 27. In each case the size of the projection 26 is such that the permanent magnet 27 comes to lie approximately at the height of the axis of the valve body 1 which connects the two capillary tubes 5 when the cover is closed. In this case, one pole of the permanent magnet 27 is facing the valve body 1; if two magnets are used, like poles of these magnets respectively face one another on either side of the valve body 1. The permanent magnet 27 generates a substantially axially oriented magnetic field in the chamber 2, which holds the valve member 8 respectively in contact with that valve seat 3 in whose vicinity it is located. If a current surge of suitable polarity is applied to the coil 17, this generates in the chamber 2 a magnetic field in the opposite direction to the induced magnetisation of the valve member 8, which moves the valve member 8 to the opposite valve seat 3. Thus, the valve 100 can be switched by applying pulses of alternating polarity to the coil 17.

The valve 100 according to the invention simplifies the structure of a coolant circuit (not illustrated) since the number of parts is reduced by directly joining the valve body 1 to the capillary tubes 5 which are used as a pressure-relieving element for the coolant. As a result of the valve 100 being joined directly to the drier 9, these two elements can be installed jointly as a compact unit. This also helps to simplify the structure of the coolant circuit (not illustrated).

The invention claimed is:

1. A solenoid valve for a coolant circuit, comprising:
    a valve body with an inlet and at least a pair of coolant outlets, each said outlet formed by a capillary tube;
    a valve member in said valve body displaceable between two positions corresponding to two switching positions of the solenoid valve;
    the dimensions of each said capillary tube are sized such that when coolant passes through the valve, the pressure drop between a beginning and an end of each said capillary tube is a multiple of the pressure drop between said valve body inlet and the beginning of said capillary tube;
    a longitudinal coil for generating a magnetic field in the longitudinal direction in said valve body for shifting said valve body between said two switching positions;
    said valve body arranged outside said longitudinal coil;
    a housing having opposite end walls, each said end wall including a cutout and said valve body mounted therein; and
    at least one cover section mounted on said housing and closeable over said valve body to retain said valve body in said housing.

2. The solenoid valve according to claim 1, including each said coolant outlet is arranged at a longitudinal end of said valve body and said inlet is arranged centrally on said valve body.

3. The solenoid valve according to claim 2, including said valve body is arranged outside said longitudinal coil and said coil including at least a pair of pole pieces in contact with said valve body for coupling in a magnetic field parallel to the longitudinal axis of said valve body.

4. The solenoid valve according to claim 1, including said housing molded from a plastic material.

5. The solenoid valve according to claim 1, including an end of each said capillary tube opens into a separate evaporator.

6. The solenoid valve according to claim 1, including said inlet is formed by an outlet pipe of a coolant drier joined to said valve body.

7. The solenoid valve according to claim 1, said housing including a pair of side walls connected to said end walls and including a pair of cover sections, each said cover section hinged on an opposite side wall with a first one of said cover sections being closed and secured over said valve body and the second one of said cover sections.

8. The solenoid valve according to claim 7, at least one of said cover sections including a projection extending into said housing when said cover section is closed and said projection including a permanent magnet for biasing said valve member in said valve body in a first one of said two switching positions.

9. The solenoid valve according to claim 8, including said second one of said cover sections including a second projection extending into said housing when said second cover section is closed and said second projection including a second permanent magnet.

* * * * *